United States Patent
Ogaz

(10) Patent No.: US 10,841,780 B1
(45) Date of Patent: Nov. 17, 2020

(54) SYSTEM AND METHOD OF AUTOMATICALLY EVALUATING AND COMMUNICATING AN EMERGENCY SITUATION

(71) Applicant: Ronald S. Ogaz, Los Gatos, CA (US)

(72) Inventor: Ronald S. Ogaz, Los Gatos, CA (US)

( * ) Notice: Subject to any disclaimer, the term of this patent is extended or adjusted under 35 U.S.C. 154(b) by 0 days.

(21) Appl. No.: 16/875,980

(22) Filed: May 15, 2020

Related U.S. Application Data

(60) Provisional application No. 62/848,447, filed on May 15, 2019.

(51) Int. Cl.
*H04W 4/90* (2018.01)
*H04W 76/50* (2018.01)
*H04W 4/029* (2018.01)
*H04W 4/021* (2018.01)

(52) U.S. Cl.
CPC .......... *H04W 4/90* (2018.02); *H04W 4/022* (2013.01); *H04W 4/029* (2018.02); *H04W 76/50* (2018.02)

(58) Field of Classification Search
CPC ......... H04W 4/38; H04W 4/90; H04W 4/021; H04W 4/029; H04W 76/50; H04W 4/80; H04W 64/00; H04W 68/00; H04W 64/006; H04W 72/1247; G01S 5/0226; G01S 5/0231; G01S 5/0236; G01S 5/0242; G01S 5/183; G01S 2205/006
See application file for complete search history.

(56) References Cited

U.S. PATENT DOCUMENTS

| | | | |
|---|---|---|---|
| 6,028,514 A * | 2/2000 | Lemelson et al. | 340/539 |
| 9,198,604 B2 * | 12/2015 | Venkatrannan et al. | A61B 5/1112 |
| 10,051,119 B2 * | 8/2018 | Self et al. | H04M 3/42357 |
| 10,403,123 B2 * | 9/2019 | Hodge | G08B 25/10 |
| 10,424,185 B2 * | 9/2019 | cordes et al. | G08B 25/016 |
| 10,573,146 B1 * | 2/2020 | Jordan et al. | G08B 21/02 |
| 2014/0368601 A1 * | 12/2014 | deCharms | H04M 1/72536 |
| 2016/0142894 A1 * | 5/2016 | Papakonstantinou et al. | H04W 4/22 |
| 2018/0310159 A1 * | 10/2018 | Katz et al. | H04W 4/90 |
| 2019/0304207 A1 * | 10/2019 | Light-Holets | G07C 5/008 |
| 2020/0135005 A1 * | 4/2020 | Katz et al. | G08B 25/001 |

* cited by examiner

*Primary Examiner* — Meless N Zewdu

(57) ABSTRACT

A system and method of automatically evaluating and communicating an emergency situation. The system includes a wearable beacon which includes an inertial measurement unit (IMU), a controller, a location tracking module, a microphone, a wireless communication module, and a portable power source. The method begins by receiving a current user location with the location tracking module. Spatial positioning and orientation (SPO) data is received with the IMU. Ambient audio data is received with the microphone. A distress notification is generated with the control is an abnormal-motion datum or abrupt-noise datum are detected. The abnormal-motion datum or the abrupt-noise datum is appended into the distress notification with the controller. The current user location is appended into the distress notification with the controller. The distress notification is sent to the recipient information with the wireless communication module.

13 Claims, 12 Drawing Sheets

SYSTEM AND METHOD OF AUTOMATICALLY EVALUATING AND COMMUNICATING AN EMERGENCY SITUATION

The current application claims a priority to the U.S. provisional patent application Ser. No. 62/848,447 filed on May 15, 2019.

FIELD OF THE INVENTION

The present invention generally relates to recreational gear. More specifically, the present invention monitors the condition of an individual participating in recreational activities and automatically evaluates and communicates in the event of an emergency situation.

BACKGROUND OF THE INVENTION

In present times, individuals are known to engage in a variety of outdoor activities and sports such as hill-climbing, mountain biking, off-road racing, or other highly kinetic sports that are preferably enjoyed far from civilization. Given the remote nature of these activities, the participants are often far beyond the reach of traditional communications networks such as cellular towers or short-wave radios. Engaging in such activities carries a risk of injury, exacerbated by the inability to readily access emergency services or medical facilities as required. Of particular concern is the possibility that an individual, either solo or separated from a main group, will become critically injured and incapacitated. With no immediate access to emergency services and the odds of a chance-discovery slim, such an injury can prove fatal even if such an incident would be minor with ready access to emergency services (e.g. a broken leg while mountain-climbing vs. a broken leg from a car accident). While it may not be presently possible for a user to carry a full medical suite (and suitably trained personnel) on their person, it is considered that a system that may summon such aid may dramatically improve the odds of survival in the event of an incapacitating injury. However, present distress beacons are generally known to require some type of user input to trigger their broadcast functions. Such a requirement may be impossible to fulfill in the most critical of situations, wherein a user is totally unconscious and incapable of operating even the most basic of equipment. Some systems attempt to overcome this limitation by creating open-circuit activators for broadcasting a distress signal, colloquially called "dead-man switches" (the implication being that the user is "dead", and therefore unable to prevent the activation of such a system). These systems, while erring on the side of caution in terms of user safety, are also understood to be undesirable for the frequency of false alarms caused by such an arrangement. It should be further noted that false alarms go beyond just a minor annoyance for users and emergency responders; the time and resources spent attending to any non-emergencies may detract from the ability or willingness to respond to real emergencies.

The present invention aims to provide a redundant, ruggedized, non-intrusive means of ensuring that a user will have ready communication with emergency services, search-and-rescue, or other aid in the event of an emergency. More specifically, the present invention will embody an autonomous communications suite capable of broadcasting a user's location and condition across any and all known communication networks, frequencies, and/or codecs as may be understood by an individual skilled in the telecommunications field. Of note among these means of communication, low-power, wide-area network (LPWAN) systems are emphasized in multiple embodiments due to the desirable nature of these systems; wherein existing infrastructure and/or powerful transmitters are not required to achieve significant omnidirectional range and transmission bandwidth. Activation of this communications suite is considered to be triggered without input from a user, instead activated in the event of an event or injury that may independently render a user incapable of summoning help. In addition to the logical processors that may enable such determinations to be made, the present invention embodies a sensor suite effectively equipped to detect and monitor the condition, movements, location, and vocalizations of a user (or any user-proximal entity) via an onboard sensor package to be detailed herein.

DETAIL DESCRIPTIONS OF THE INVENTION

All illustrations of the drawings are for the purpose of describing selected versions of the present invention and are not intended to limit the scope of the present invention.

Figure 1:
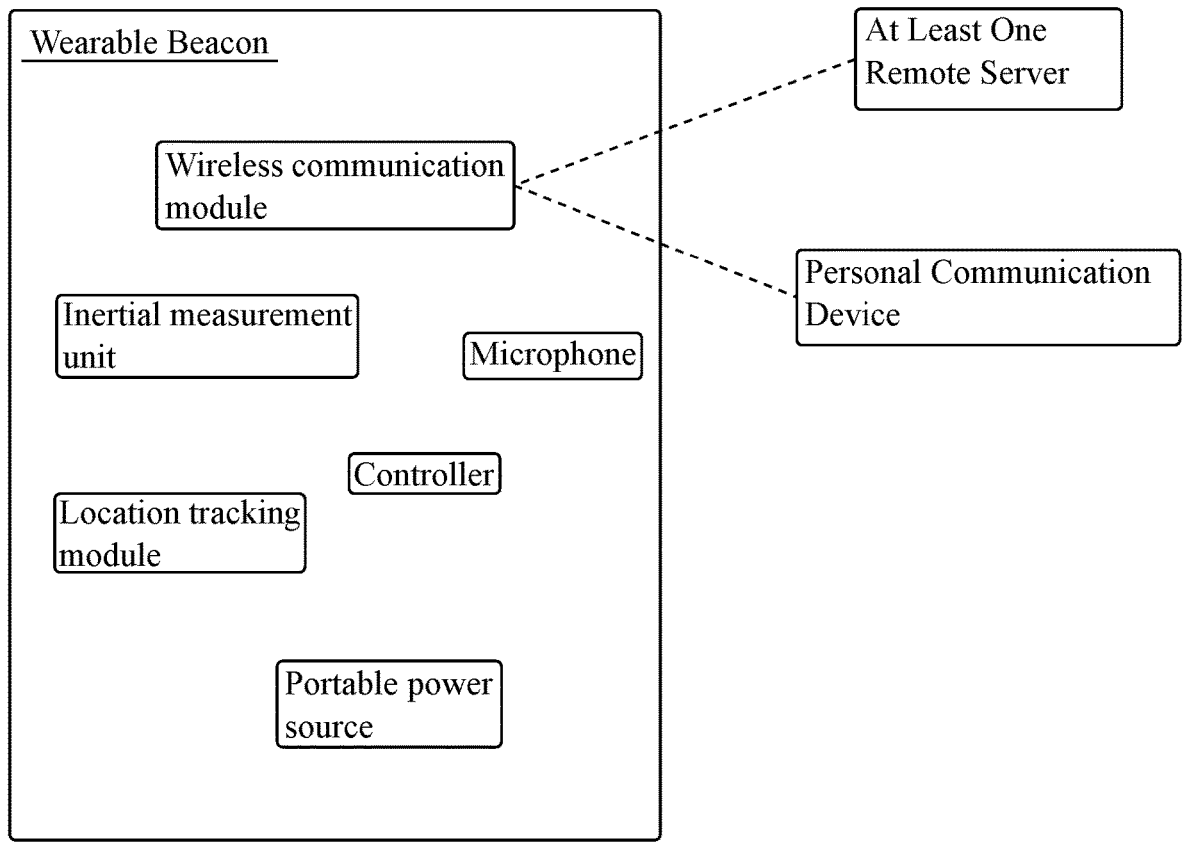
FIG. 1 is a schematic view of the system of the present invention.

The present invention is a system and method of automatically evaluating and communicating an emergency situation. Thus, the physical system used to implement the method for the present invention includes a wearable beacon (Step A), seen in FIG. 1. The wearable beacon provides emergency responders with the necessary information to identify and locate a user with the wearable beacon and rescue the user. The wearable beacon can preferably be physically integrated in a piece of safety headgear equipment. The wearable beacon can alternatively be integrated into a variety of articles of clothing and protective gear. The wearable beacon includes an inertial measurement unit (IMU), a controller, a location tracking module, a microphone, a wireless communication module, and a portable power source. The IMU is a combination of accelerometers, gyroscopes, and a magnetometer that monitors the motion and orientation of the user. The IMU is used to detect any high-speed accident of the user, any high-impact force against the user, a serious or fatal fall of the user, and so on. The controller performers a variety of functions in order to analyze the current state of the user with the wearable beacon. Moreover, the controller processes the state of the user and the type of aid request as well as delivers information and messages for emergency responders with the wireless communication module. The wireless communication module can be, but is not limited to, a low-energy module for a wide area network, a communication module for long range (LoRa) radio, or combinations thereof. Recipient information is stored by the controller so that the wearable beacon is readily able to output an emergency notification The location tracking module monitors and registers the current location of the user with the wearable beacon in order to determine the current location of the user in need of aid or in the event of an emergency. The location tracking module is preferably linked to a global positioning system (GPS). The microphone receives audio commands from the user as well as vocal cues for the controller to immediately determine a distressed or seriously injured user. The portable power source may be, but is not limited to, a replaceable battery and a rechargeable battery. The IMU, the controller, the location tracking module, the microphone, and the wireless communication module are electrically connected to the portable power source in order to provide the necessary power for the wearable beacon to remotely operate.

Figure 2:
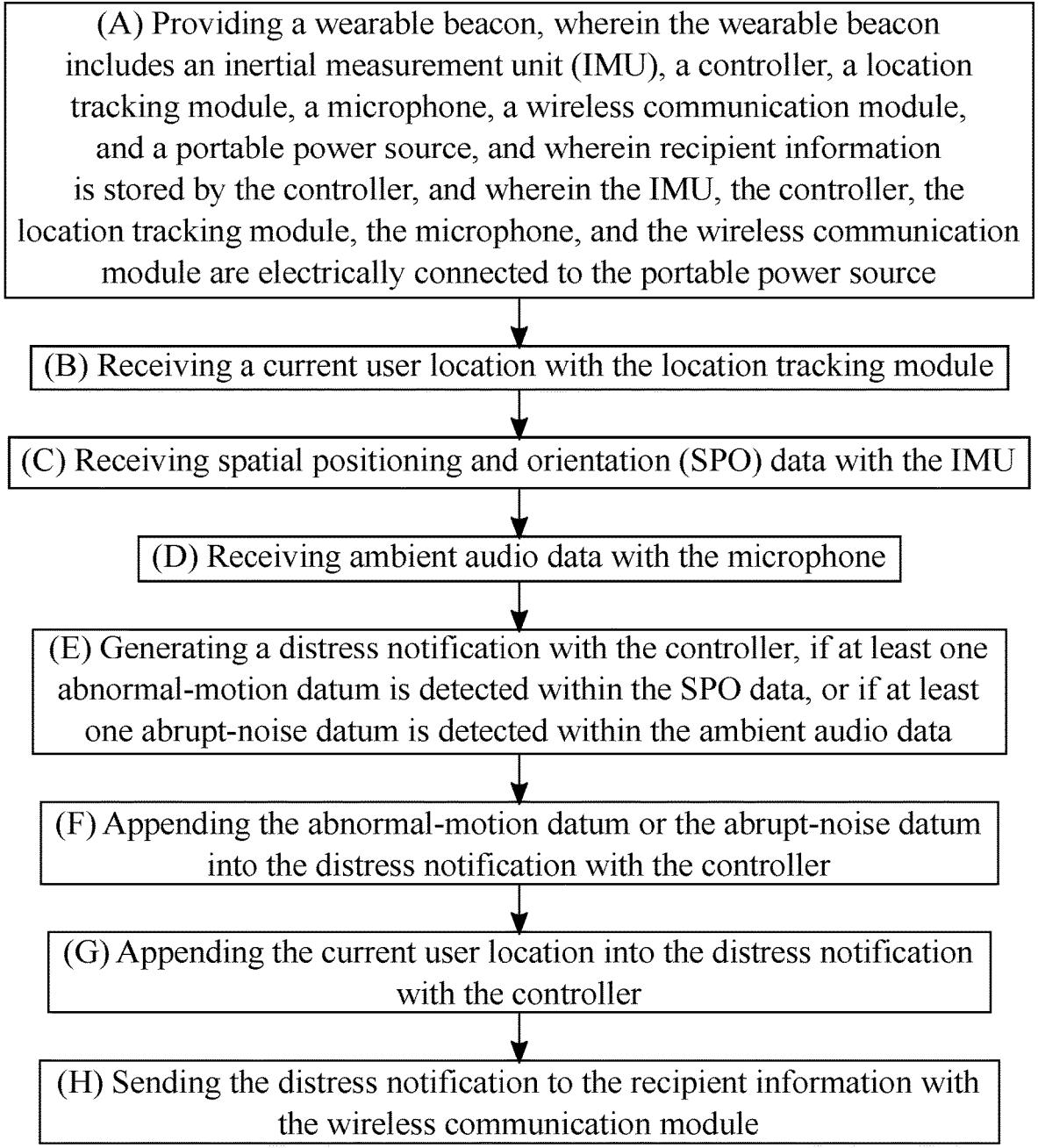
FIG. 2 is a flowchart illustrating the overall process for the method of the present invention.

The overall process for the method of the present invention includes the following steps that are implemented with the wearable beacon. The overall process begins by receiving a current user location with the location tracking module (Step B), as seen in FIG. 2. The current user location provides emergency responders with the necessary information to identify and locate the user with the wearable beacon. In order to determine the type aid requested by the user and as the severity of an emergency for the user with the wearable beacon, spatial positioning and orientation (SPO) data is received with the IMU (Step C). SPO data identifies if the user has fallen, has been struck, or is not able to remain upright. The type and severity of an emergency is also determined by any sounds that indicate an accident, attack or pain. These types of sounds are identified as ambient audio data is received with the microphone (Step D). A distress notification is generated with the controller, if at least one abnormal-motion datum is detected within the SPO data, or if at least one abrupt-noise datum is detected within the ambient audio data (Step E). The distress notification presents emergency responders with a message requesting immediate aid and action for the at least one abnormal-motion datum or the at least one abrupt-noise datum. The at least one abnormal-motion datum defines a notable irregularity for the speed of the user, the orientation of the user, or a force against a user. Similarly, the at least one abrupt-noise datum defines a notable irregularity for the speech of the user or the sounds of the surrounding environment. The abnormal-motion datum or the abrupt-noise datum is appended into the distress notification with the controller (Step F), and the current user location is appended into the distress notification with the controller (Step G). The distress notification therefore provides the emergency responders with the necessary information to identify the location and the determine the appropriate actions to attend to the user. The emergency responders are made aware of the emergency as the distress notification is sent to the recipient information with the wireless communication module (Step H).

Figure 3:
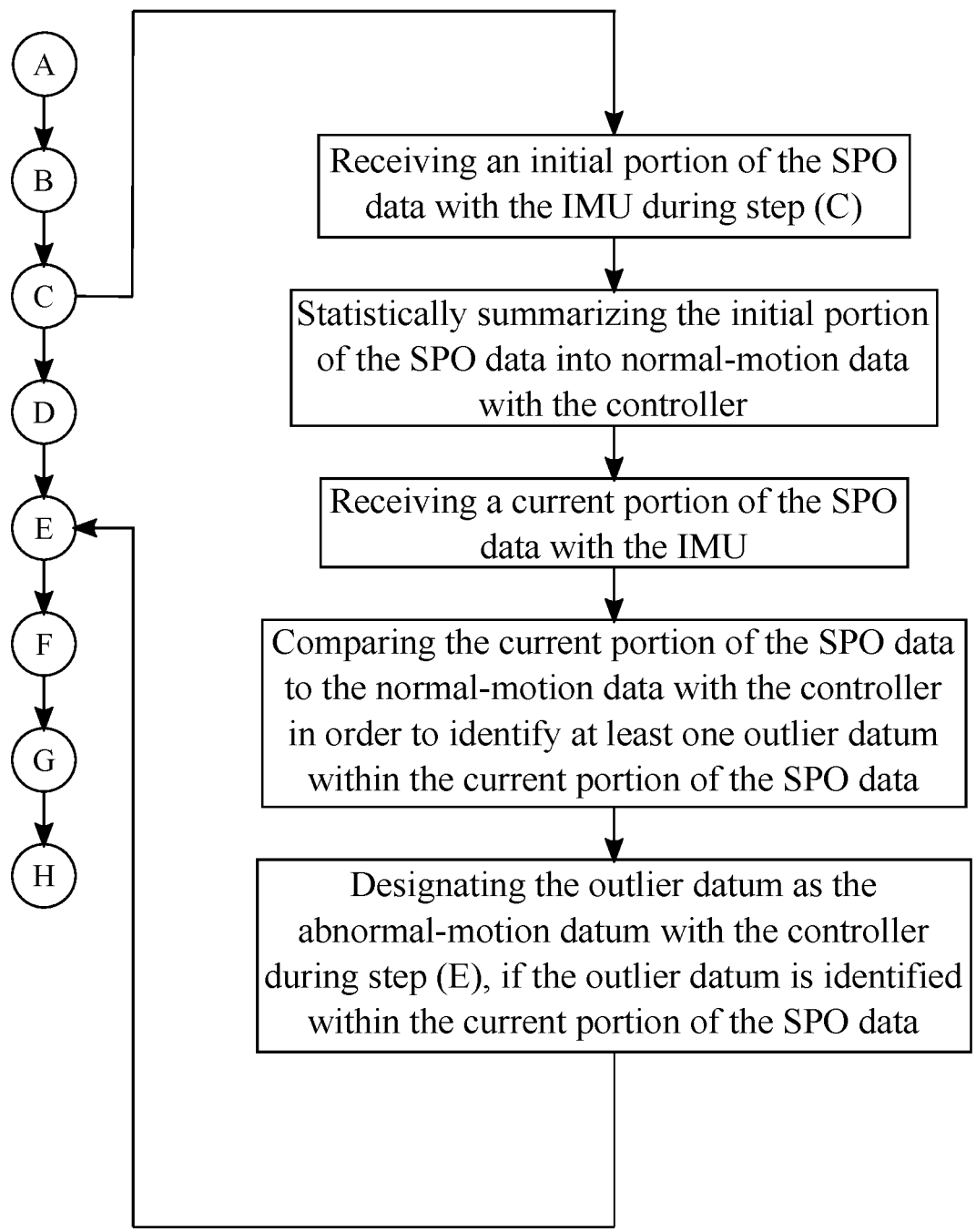
FIG. 3 is a flowchart illustrating the subprocess of identifying an emergency with an inertial measurement unit for the method of the present invention.

The wearable beacon is able to distinguish between emergencies and non-alarming situations with the standard movements and positioned of the user as an initial portion of the SPO is received with the IMU during Step C, as seen in FIG. 3. The initial portion of the SPO are common and non-alarming movements of a user such as walking and standing. The initial portion of the SPO data is statistically summarized into normal-motion data with the controller so that the normal-motion data serves as a standard for comparison. As the user keeps moving with the wearable beacon, the movements of the user continue to be monitored as a current portion of the SPO data is received with the IMU. The current portion of the SPO data is compared to the normal-motion data with the controller in order to identify at least one outlier datum with the current portion of the SPO data. The controller is able to identify an accident or an emergency for the user with the at least one outlier datum. Therefore, movements and orientations of the user outside of the normal-motion data are only movements and orientations that are associated with an emergency. The outlier datum is designated as the abnormal-motion datum with the controller during Step E, if the outlier datum is identified within the current portion of the SPO data, and, thus the abnormal-motion datum is defined as the movements and orientations of the user that are associated with an emergency.

Figure 4:
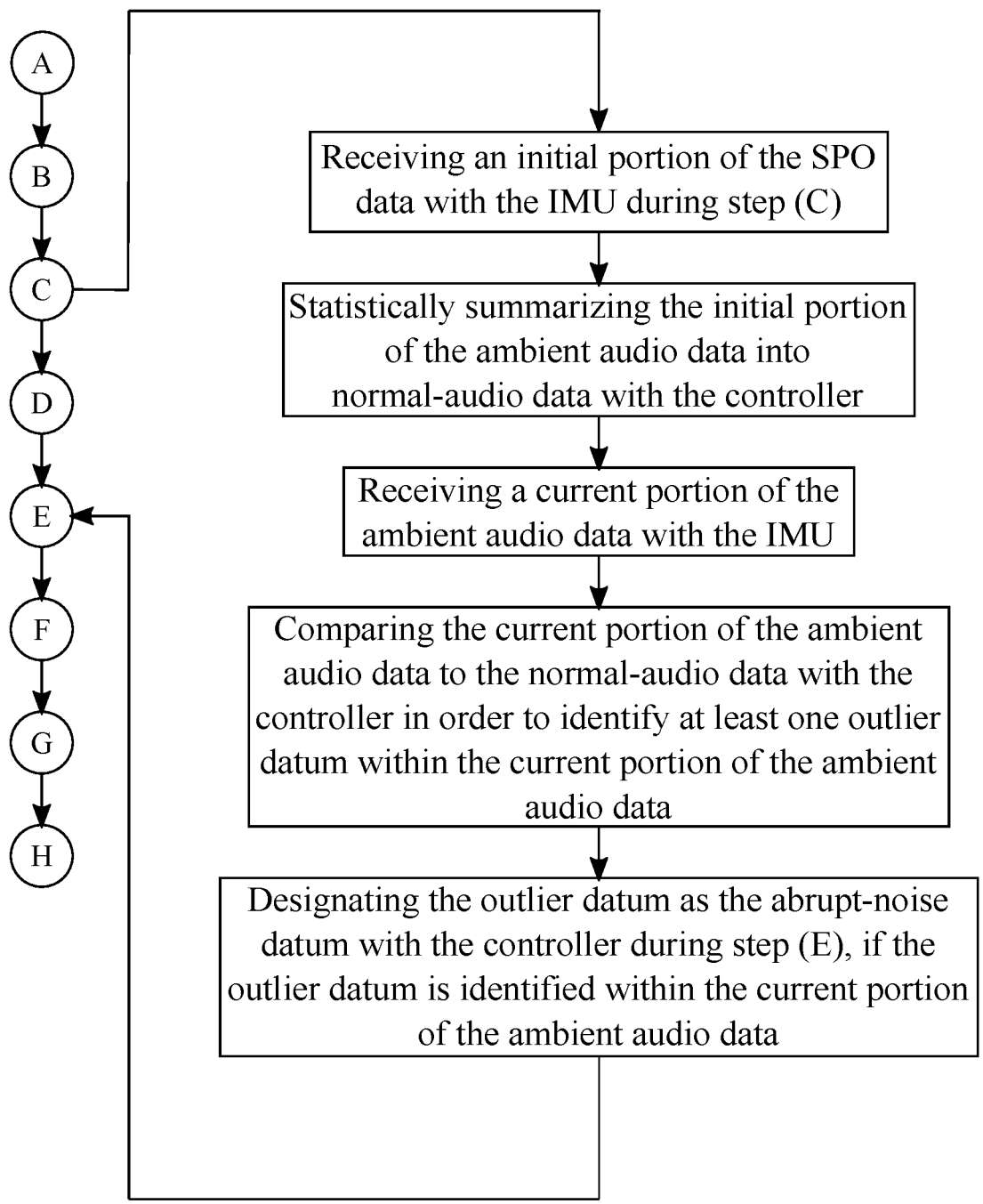
FIG. 4 is a flowchart illustrating the subprocess of identifying an emergency with a microphone for the method of the present invention.

Similarly, the wearable beacon is also able to confirm the difference between emergencies and non-alarming situations with the speech of a user as an initial portion of the ambient audio data is received with the IMU during Step C, seen in FIG. 4. Moreover, if no abnormal-motion datum is detected within the SPO data, an emergency may be identified with the initial portion of the ambient audio data. The initial portion of the ambient audio data may be the common fluctuations in the voice of the user while in non-threatening situations and/or may be regularly-occurring sounds from the surroundings of the user. The initial portion of the ambient audio data is statistically summarized into normal-audio data with the controller so that the normal-audio data serves as a standard for comparison. As the user keeps moving with the wearable beacon, the speech of the user continues to be monitored as a current portion of the ambient audio data is received with the IMU. The current portion of the ambient audio data is compared to the normal-audio data with the controller in order to identify at least one outlier datum within the current portion of the ambient audio data. The controller is able to identify an accident or an emergency for the user with the at least one outlier datum. The outlier datum is designated as an abrupt-noise datum with the controller during Step E, if the outlier datum is identified within the current portion of the ambient audio data, and, thus, the abrupt-noise datum is defined as the fluctuations in the speech of the user that are associated with an emergency.

Figure 5:
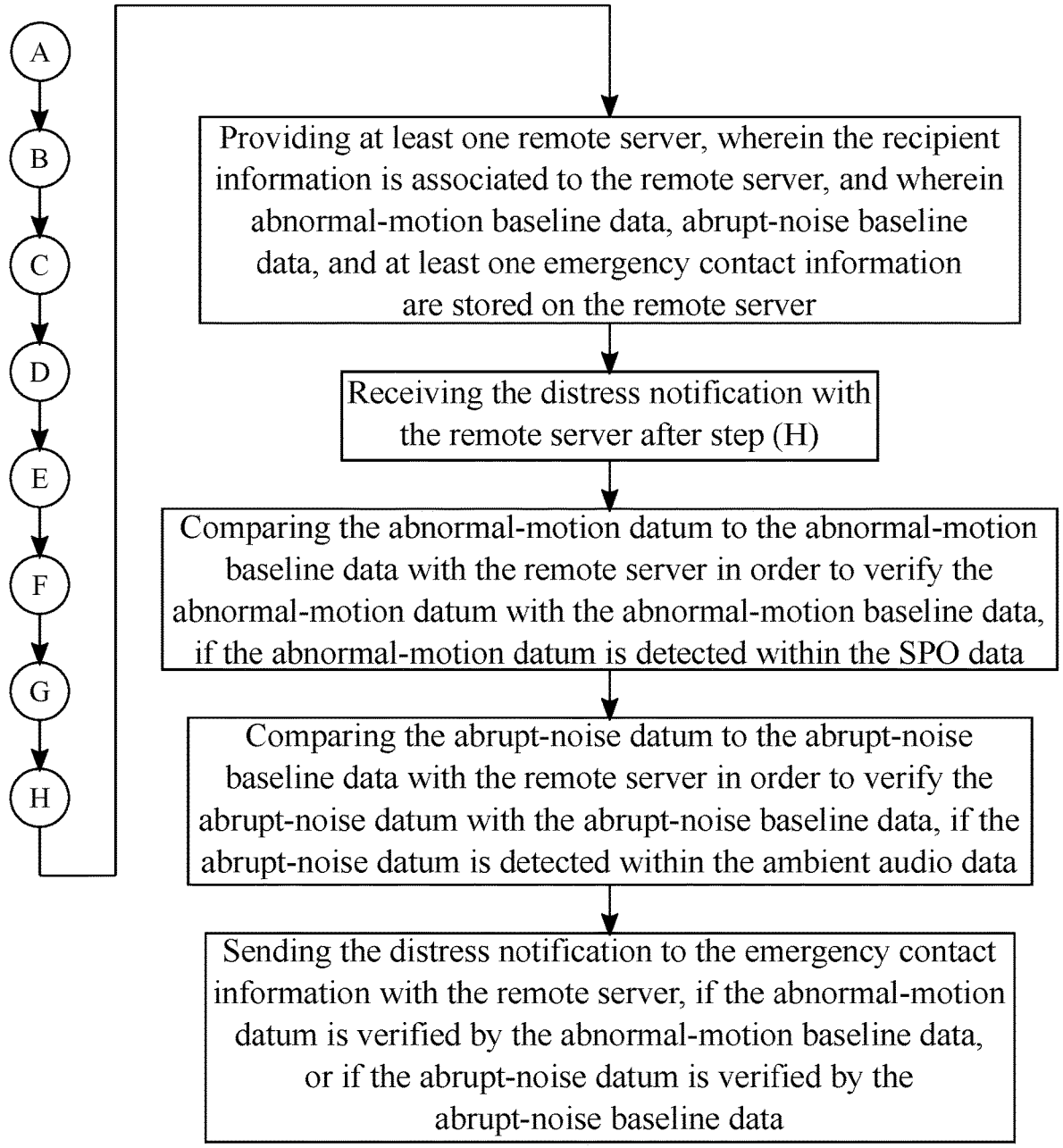
FIG. 5 is a flowchart illustrating the subprocess of sending a distress notification to at least one remote server for the method of the present invention.

In order to store information associated with the wearable beacon, at least one remote server is provided, as seen in FIG. 5. Moreover, the recipient information is associated to the remote server, and the abnormal-motion baseline data, abrupt-noise baseline data, and at least one emergency contact information are stored on the remote server. The abnormal-motion data is data that is compiled over time in order to define well-established instances of abnormal motion that are typically associated with an emergency. In addition, the abrupt-noise baseline data is data that is compiled over time in order to define well-established instances of abrupt noises that are typically associated with an emergency. The at least one emergency contact information provides the necessary information to deliver an alert to an individual, such as a parent, a spouse, or a first responder. The distress notification is received with the remote server after Step H in order to use the remote server as a relay point for the distress notification. The abnormal-motion datum is compared to the abnormal-motion baseline data with the remote server in order to verify the abnormal-motion datum with the abnormal-motion baseline data, if the abnormal-motion datum is detected within the SPO data. This allows the present invention to double check that the abnormal-motion datum is not a false alarm and is indicating an actual emergency with the user. Likewise, the abrupt-noise datum is compared to the abrupt-noise baseline data with the remote server in order to verify the abrupt-noise datum with the abrupt-noise baseline, if the abrupt-noise datum is detected within the ambient audio data. This similarly allows the present invention to double check that the abrupt-noise datum is not a false alarm and is indicating an actual emergency with the user. The distress notification is then sent to the emergency contact information with the remote server, if the abnormal-motion datum is verified by the abnormal-motion baseline data, or if the abrupt-noise datum is verified by the abrupt-noise baseline data, so that the remote server only acts as a relay point for the distress notification for a verified emergency with the user.

Figure 6:
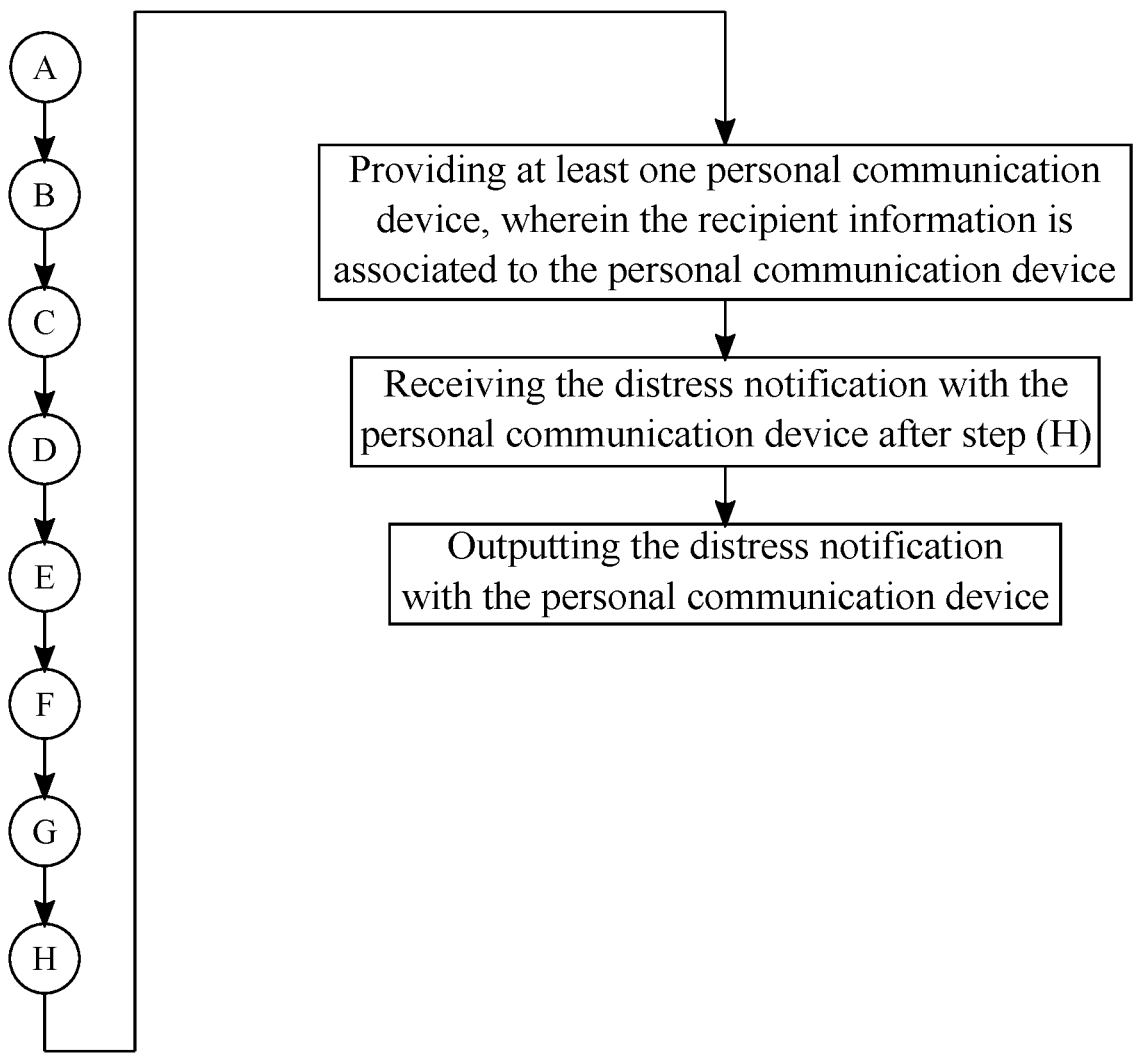
FIG. 6 is a flowchart illustrating the subprocess of sending a distress notification to a personal communication device for the method of the present invention.

In order for emergency responders to receive the distress notification, at least one personal communication device is provided, seen in FIG. 6. The personal communication device can be, but is not limited to, a mobile cellular phone, a mobile computerized phone, a pager, a desktop, a laptop, or a tablet personal computer. The recipient information is associated to the personal communication device, thereby identifying each emergency responder. The distress notification is received with the personal communication device after Step H, and the distress notification is outputted with the personal communication device. The appropriate emergency responder is then able to view the distress notification and act accordingly.

Figure 7:
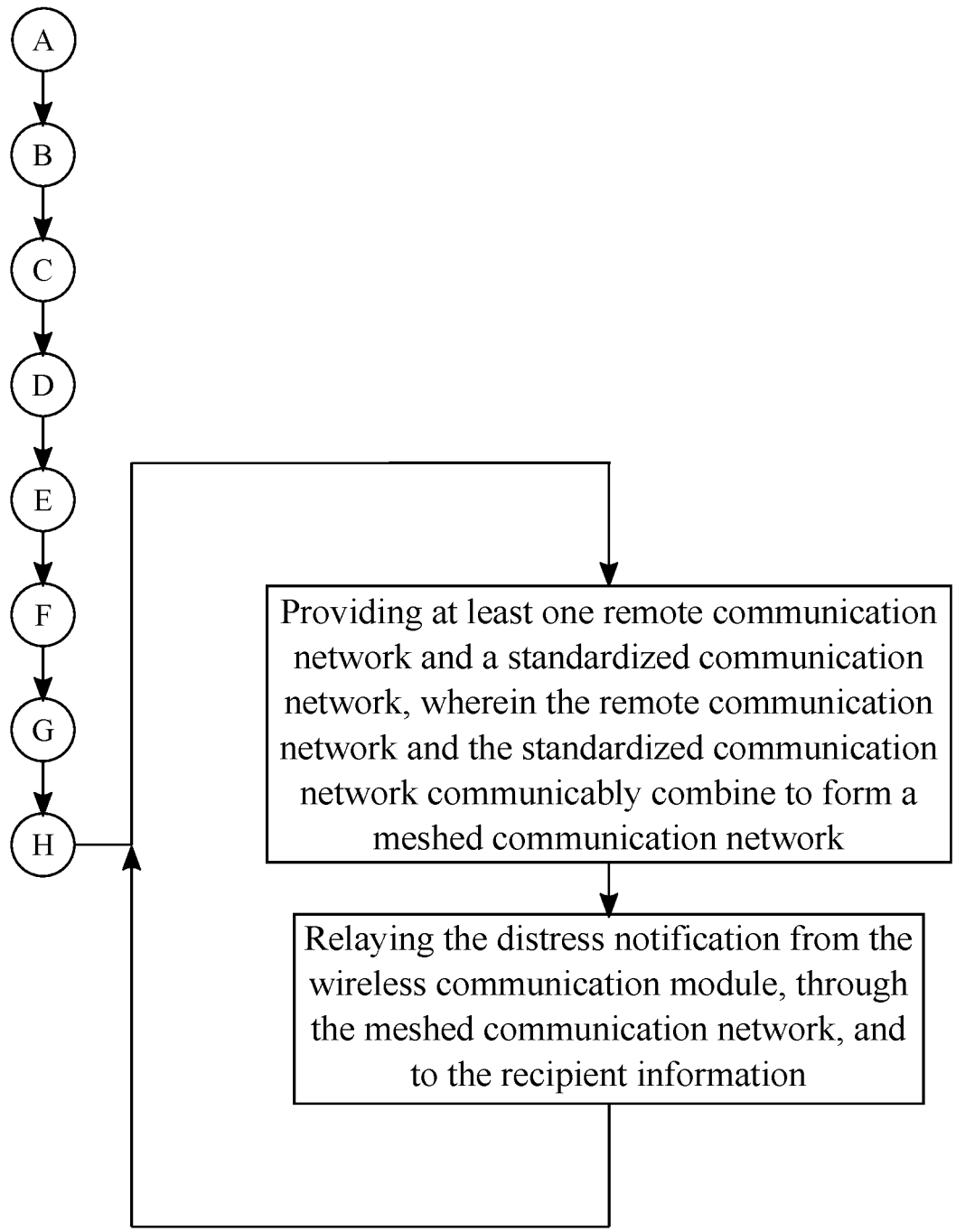
FIG. 7 is a flowchart illustrating the subprocess of relaying a distress notification through a meshed communication network for the method of the present invention.

The wearable beacon is able to communicate with emergency responders regardless of location, as at least one remote communication network and a standardized communication network is provided, as seen in FIG. 7. The at least one remote communication network allows for wireless communication in a remote geospatial area, where a standardized communication network (e.g. a network of cellular towers, a satellite network, a landline network, etc.) is not available for wireless communication. For example, administrators for an outdoor natural park would setup the remote communication network in order for its visitors to have access to wireless communication with their electronic devices throughout the outdoor natural park. The remote communication network and the standardized communication network are communicable combined to form a meshed communication network so that the wireless communication is able to traverse from the remote communication network to the standardized communication network and vice versa. Thus, the distress notification is relayed from the wireless communication module, through the meshed communication network, and to the recipient information in order to alert an emergency responder with the distress notification even from the remote geospatial areas.

Figure 8:
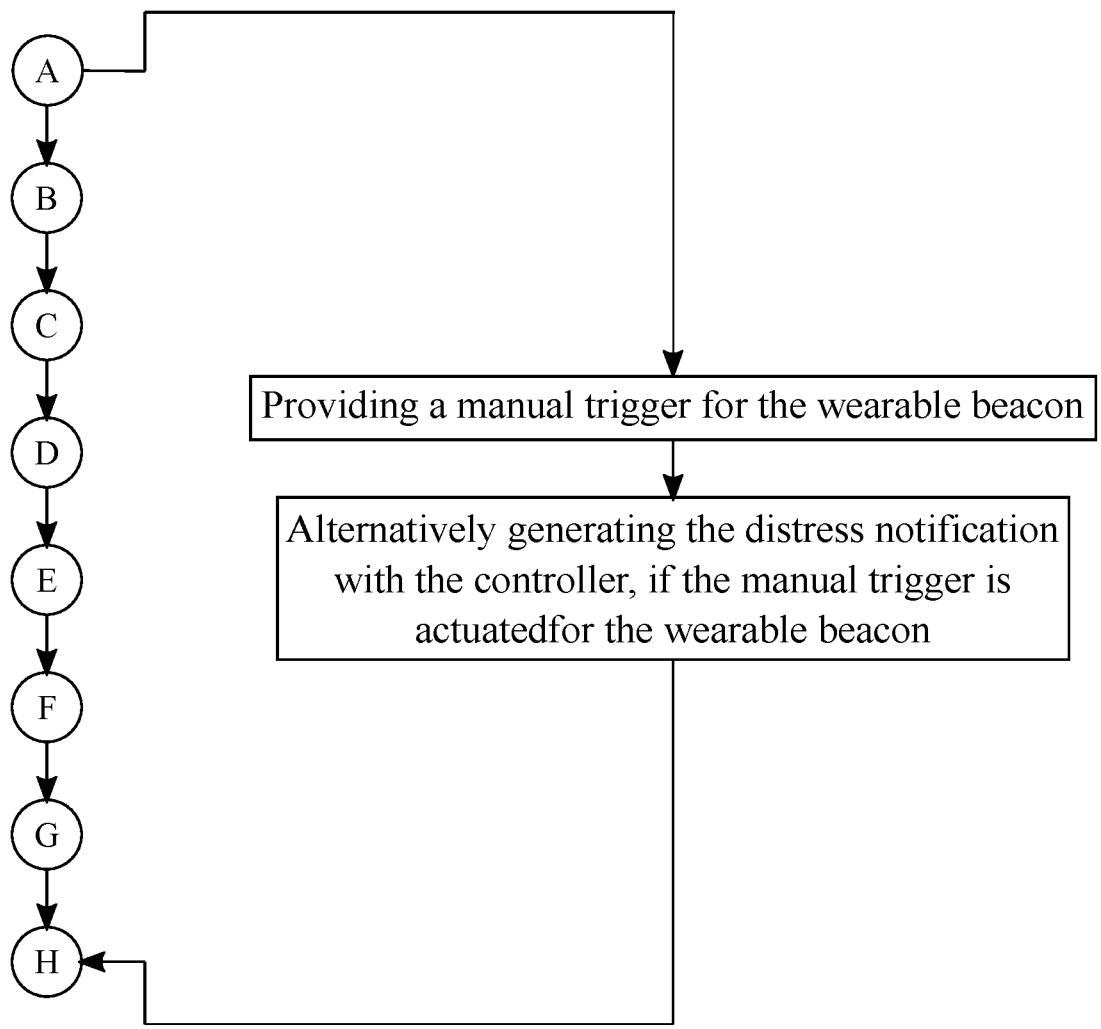
FIG. 8 is a flowchart illustrating the subprocess of generating a distress notification with a manual trigger for the method of the present invention.

In the event the user with the wearable beacon is physically capable to request aid, a manual trigger is also provided for the wearable beacon, seen in FIG. 8. The manual trigger allows the user to immediately contact emergency responders. The distress notification is alternatively generated with the controller, if the manual trigger is actuated for the wearable beacon so that the user of the wearable beacon is readily able to generate the distress notification with the present invention while consciously alert.

Figure 9:
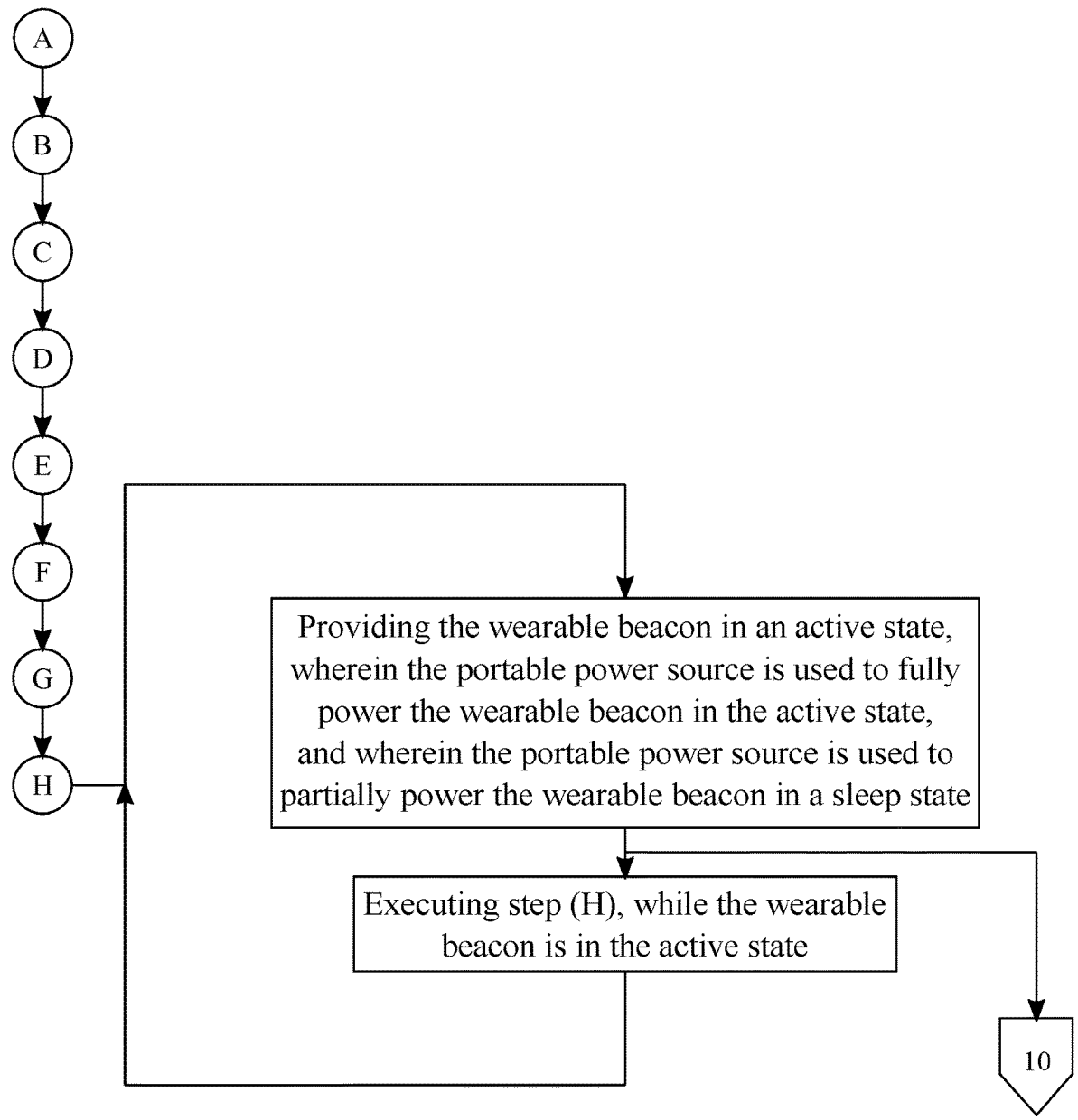
FIG. 9 is a flowchart illustrating the subprocess of maintaining full power with a power source while the wearable beacon is in an active state for the method of the present invention.
Figure 10:
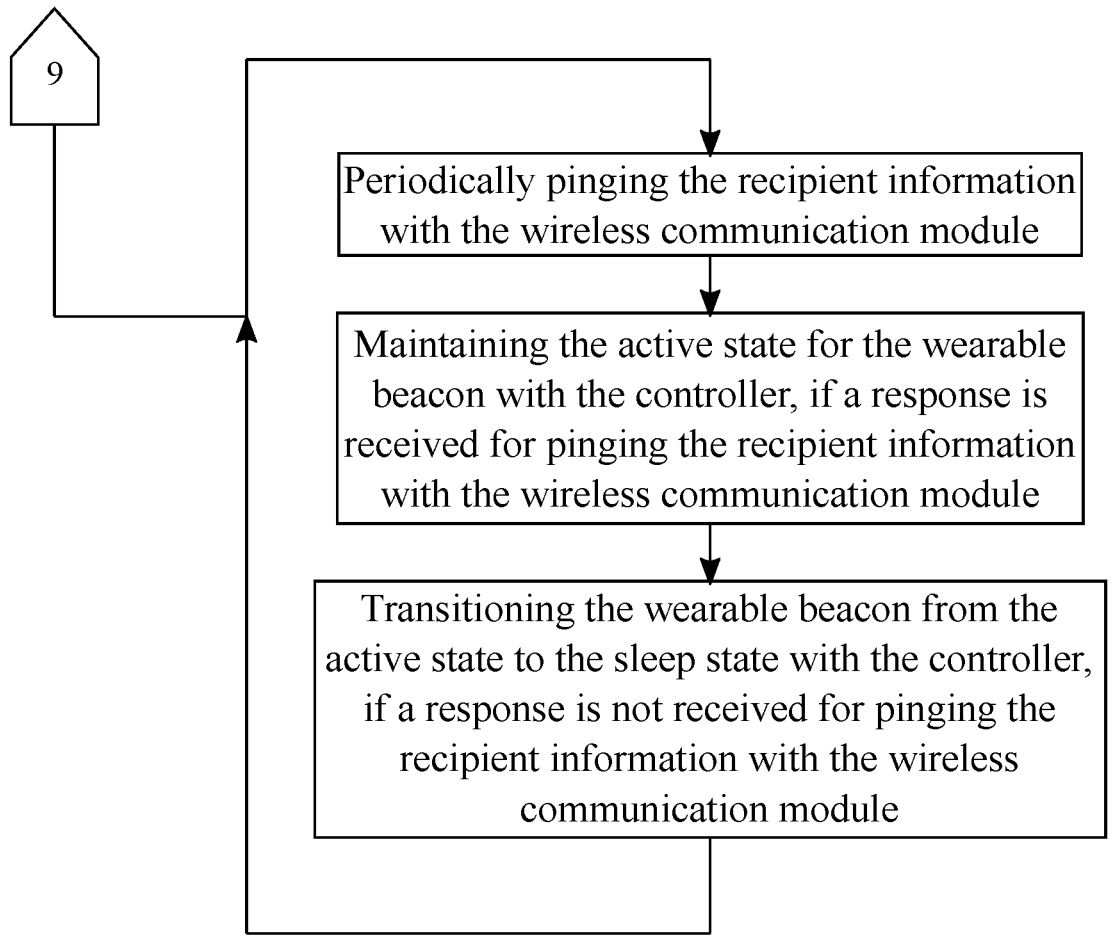
FIG. 10 is a flowchart illustrating the subprocess of continuously monitoring a network connection with the wireless communication module while in the active state for the method of the present invention.

In order for the wearable beacon to conserve energy with the portable power source, the portable power source is used to fully power the wearable beacon in an active state, and the portable power source is used to partially power the wearable beacon in a sleep state. Thus, Step H is executed while the wearable beacon is in the active state, as seen in FIG. 9. The recipient information is periodically pinging with the wireless communication module, confirming that the wearable beacon is within range of a communication network, as seen in FIG. 10. The active state for the wearable beacon is maintained with the controller, if a response is received for pinging the recipient information with the wireless communication module, so that a distress notification may be sent from the wearable beacon at any point in time. The wearable beacon is transitioned from the active state to the sleep state with the controller, if a response is not received for pinging the recipient information with the wireless communication module, in order to conserve power when the wireless communication module is not able to send a distress notification.

Figure 11:
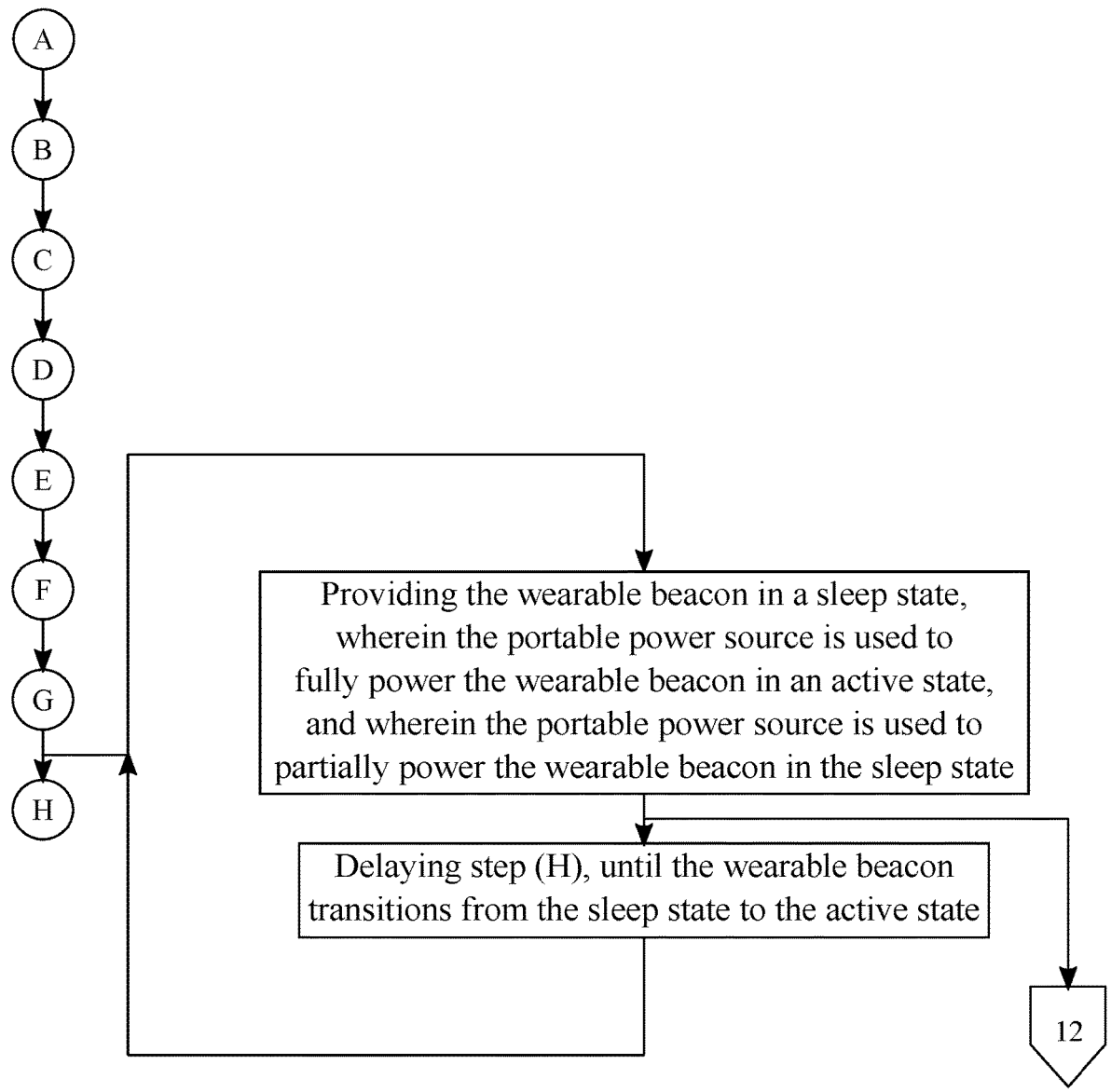
FIG. 11 is a flowchart illustrating the subprocess of maintaining partial power with the power source while the wearable beacon is in a sleep state for the method of the present invention.
Figure 12:
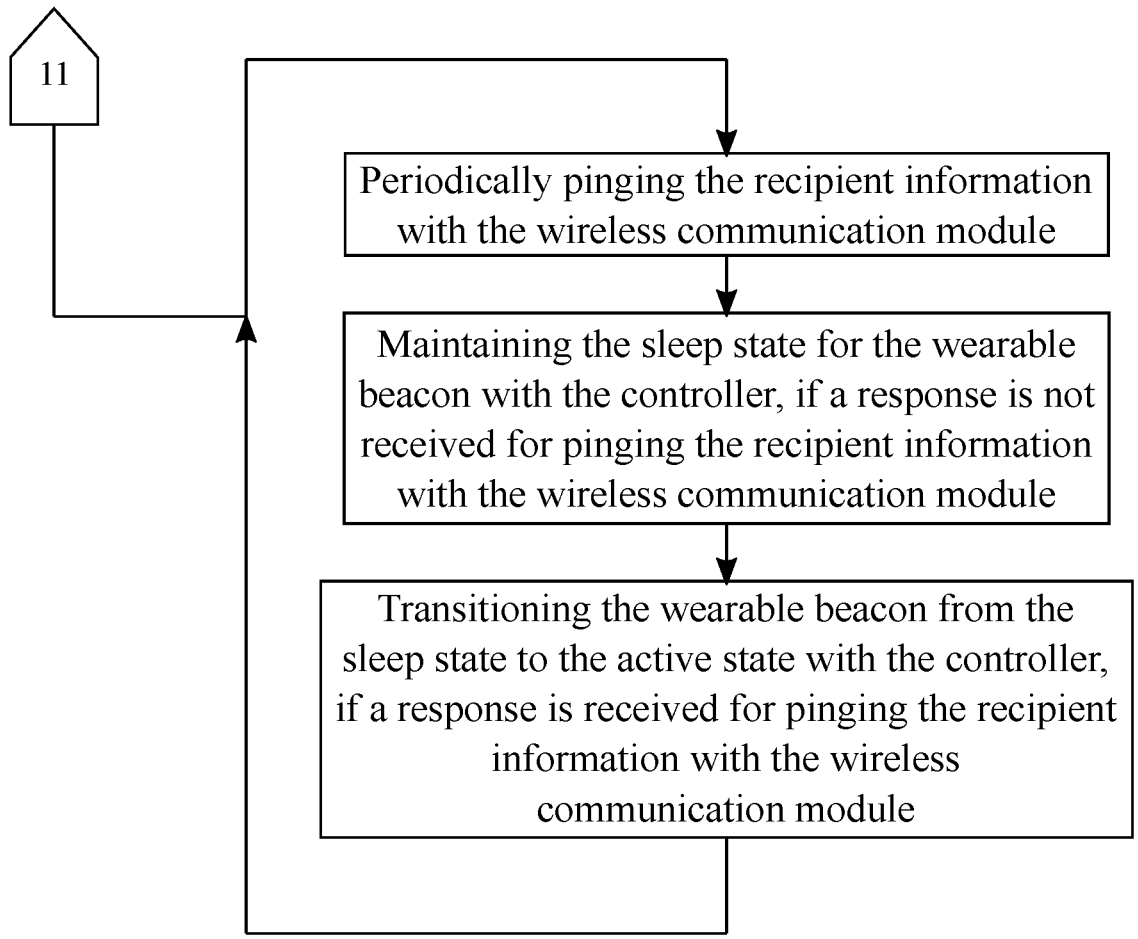
FIG. 12 is a flowchart illustrating the subprocess of continuously monitoring a network connection with the wireless communication module while in the sleep state for the method of the present invention.

Moreover, while the wearable beacon is in the sleep state, Step H is then delayed until the wearable beacon transitions from the sleep state to the active state, seen in FIG. 11, so that the power is reserved only when the wireless communication module is able to send a distress notification. The recipient information is periodically pinged with is periodically pinged with the wireless communication module, in an attempt to connect with a communication network, as seen in FIG. 12. The sleep state for the wearable beacon is maintained with the controller, if a response is not received for pinging the recipient information with the wireless communication module. Conversely, the wearable beacon transitions from the sleep state to the active state with the controller, if a response is received for pinging the recipient information with the wireless communication module.

The wireless communication module allows the present invention to be implemented as a part of the $3^{rd}$ Gen Partnership Project (3GPP) specification standard, which is a standalone Narrowband Internet of Things (NB-IoT) wireless network and is not part of a 4G, 5G cellular network. This provides increased range and coverage. The meshed communication network increases the range when needed and a special protocol would need to be added to awaking an adjacent NB-IoT base station and to pass the message to the base station attached to the backhaul.

Although the invention has been explained in relation to its preferred embodiment, it is to be understood that many other possible modifications and variations can be made without departing from the spirit and scope of the invention as hereinafter claimed.

What is claimed is:

1. A method of automatically evaluating and communicating an emergency situation, the method comprises the steps:

(A) providing a wearable beacon, wherein the wearable beacon includes an inertial measurement unit (IMU), a controller, a location tracking module, a microphone, a wireless communication module, and a portable power source, and wherein recipient information is stored by the controller, and wherein the IMU, the controller, the location tracking module, the microphone, and the wireless communication module are electrically connected to the portable power source;

(B) receiving a current user location with the location tracking module;

(C) receiving spatial positioning and orientation (SPO) data with the IMU;

(D) receiving ambient audio data with the microphone;

(E) generating a distress notification with the controller, if at least one abnormal-motion datum is detected within the SPO data, or if at least one abrupt-noise datum is detected within the ambient audio data;

(F) appending the abnormal-motion datum or the abrupt-noise datum into the distress notification with the controller;

(G) appending the current user location into the distress notification with the controller; and, (H) sending the distress notification to a recipient based on the stored recipient information using the wireless communication module.

2. The method of said automatically evaluating and communicating the emergency situation, the method as claimed in claim 1 comprises the steps:

receiving an initial portion of the SPO data with the IMU during the step (C);

statistically summarizing the initial portion of the SPO data into normal-motion data with the controller;

receiving a current portion of the SPO data with the IMU;

comparing the current portion of the SPO data to the normal-motion data with the controller in order to identify at least one outlier datum within the current portion of the SPO data; and, designating the outlier datum as the abnormal-motion datum with the controller during the step (E), if the outlier datum is identified within the current portion of the SPO data.

3. The method of said automatically evaluating and communicating the emergency situation, the method as claimed in claim 1 comprises the steps:

receiving an initial portion of the ambient audio data with the IMU during the step (C);

statistically summarizing the initial portion of the ambient audio data into normal-audio data with the controller;

receiving a current portion of the ambient audio data with the IMU;

comparing the current portion of the ambient audio data to the normal-audio data with the controller in order to identify at least one outlier datum within the current portion of the ambient audio data; and, designating the outlier datum as the abrupt-noise datum with the controller during the step (E), if the outlier datum is identified within the current portion of the ambient audio data.

4. The method of said automatically evaluating and communicating the emergency situation, the method as claimed in claim 1 comprises the steps:

providing at least one remote server, wherein the recipient information is associated to the remote server, and wherein abnormal-motion baseline data, abrupt-noise baseline data, and at least one emergency contact information are stored on the remote server;

receiving the distress notification at the remote server after the step (H);

comparing the abnormal-motion datum to the abnormal-motion baseline data with the remote server in order to verify the abnormal-motion datum with the abnormal-motion baseline data, if the abnormal-motion datum is detected within the SPO data;

comparing the abrupt-noise datum to the abrupt-noise baseline data with the remote server in order to verify the abrupt-noise datum with the abrupt-noise baseline data, if the abrupt-noise datum is detected within the ambient audio data; and, sending the distress notification to an emergency contact based on the at least one emergency contact information by the remote server, if the abnormal-motion datum is verified by the abnormal-motion baseline data, or if the abrupt-noise datum is verified by the abrupt-noise baseline data.

5. The method of said automatically evaluating and communicating the emergency situation, the method as claimed in claim 1 comprises the steps:

providing at least one personal communication device, wherein the recipient information is associated to the personal communication device;

receiving the distress notification with the personal communication device after the step (H); and, outputting the distress notification with the personal communication device.

6. The method of said automatically evaluating and communicating the emergency situation, the method as claimed in claim 1 comprises the steps:

providing at least one remote communication network and a standardized communication network, wherein the remote communication network and the standardized communication network communicably combine to form a meshed communication network; and, relaying the distress notification from the wireless communication module, through the meshed communication network, and to a recipient based on the recipient information.

7. The method of said automatically evaluating and communicating the emergency situation, the method as claimed in claim 1 comprises the steps:

providing a manual trigger for the wearable beacon; and, alternatively generating the distress notification with the controller, if the manual trigger is actuated for the wearable beacon.

8. The method of said automatically evaluating and communicating the emergency situation, the method as claimed in claim 1 comprises the steps:

providing the wearable beacon in an active state, wherein the portable power source is used to fully power the wearable beacon in the active state, and wherein the portable power source is used to partially power the wearable beacon in a sleep state; and, executing the step (H), while the wearable beacon is in the active state.

9. The method of said automatically evaluating and communicating the emergency situation, the method as claimed in claim 8 comprises further steps:

periodically pinging the recipient information with the wireless communication module;

maintaining the active state for the wearable beacon with the controller, if a response is received for the pinging of the recipient information with the wireless communication module; and, transitioning the wearable beacon from the active state to the sleep state with the controller, if the response is not received for the pinging of the recipient information with the wireless communication module.

10. The method of said automatically evaluating and communicating the emergency situation, the method as claimed in claim 1 comprises further steps:

providing the wearable beacon in a sleep state, wherein the portable power source is used to fully power the wearable beacon in an active state, and wherein the portable power source is used to partially power the wearable beacon in the sleep state; and, delaying the step (H), until the wearable beacon transitions from the sleep state to the active state.

11. The method of said automatically evaluating and communicating the emergency situation, the method as claimed in claim 10 comprises further steps:

periodically pinging the recipient information with the wireless communication module;

maintaining the sleep state for the wearable beacon with the controller, if a response is not received for the pinging of the recipient information with the wireless communication module; and, transitioning the wearable beacon from the sleep state to the active state with the controller, if the response is received for the pinging of the recipient information with the wireless communication module.

12. The method of said automatically evaluating and communicating the emergency situation, the method as claimed in claim 1, wherein the wireless communication module is selected from a group consisting of: a low-energy communication module for a personal area network, a low-energy communication module for a wide area network, a communication module for long range (LoRa) radio, and combinations thereof.

13. The method of said automatically evaluating and communicating the emergency situation, the method as claimed in claim 1, wherein the wearable beacon is physically integrated in a piece of safety headgear equipment.

* * * * *